(No Model.)

C. GRAHAM.
Fastening Boiler Tubes.

No. 232,259. Patented Sept. 14, 1880.

Witnesses
John Becher
Thomas E. Birch

Inventor
Charles Graham
by his Attorneys
Brown & Brown

UNITED STATES PATENT OFFICE.

CHARLES GRAHAM, OF KINGSTON, PENNSYLVANIA.

FASTENING BOILER-TUBES.

SPECIFICATION forming part of Letters Patent No. 232,259, dated September 14, 1880.

Application filed May 18, 1880. (No model.)

*To all whom it may concern:*

Be it known that I, CHARLES GRAHAM, of Kingston, in the county of Luzerne and State of Pennsylvania, have invented a certain new and Improved Method of Fastening Boiler-Tubes, of which the following is a specification.

The most common method of fastening tubes in tube-sheets is to make smooth straight holes in the tube-sheet and expand the tube inside and outside the tube-sheet. Such fastening, however, has often proved defective. In some instances the holes in the tube-sheet have had formed in each of them a single annular groove, into which the tube was expanded.

In Patent No. 226,741, granted to me April 20, 1880, I describe and claim the tube secured in the tube-hole by means of a spiral groove formed in the wall of the hole.

My present invention, however, consists in first forming in the tube-hole a series of annular grooves in planes at right angles to the length of the tube, forming a series of straight cylindric lands or portions interspersed between the grooves, then inserting the tube having a smooth exterior into the hole thus prepared, and expanding it so that its exterior enters said grooves, whereby I provide for securing the tube in its hole without forcing out its inner surface to conform to the groove, and thereby "punishing" or straining the tube, as is liable to be done when a single wide and deep groove is formed between the edges of the tube-sheet.

Figure 1:
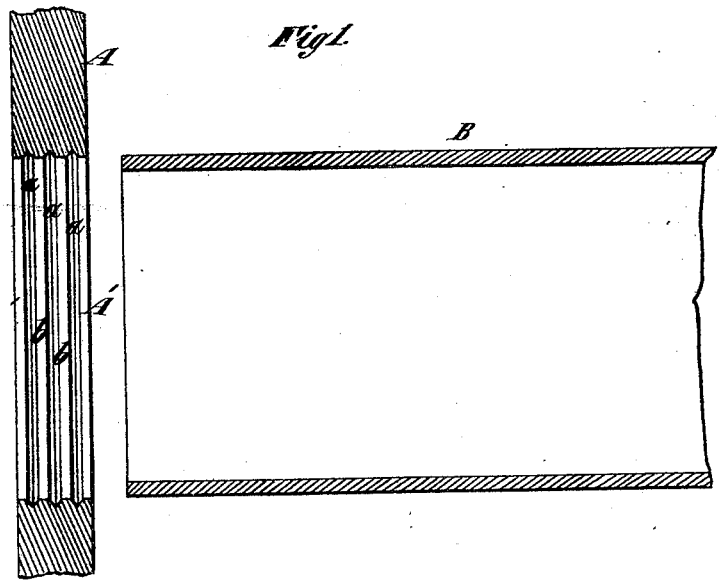
Figure 2:
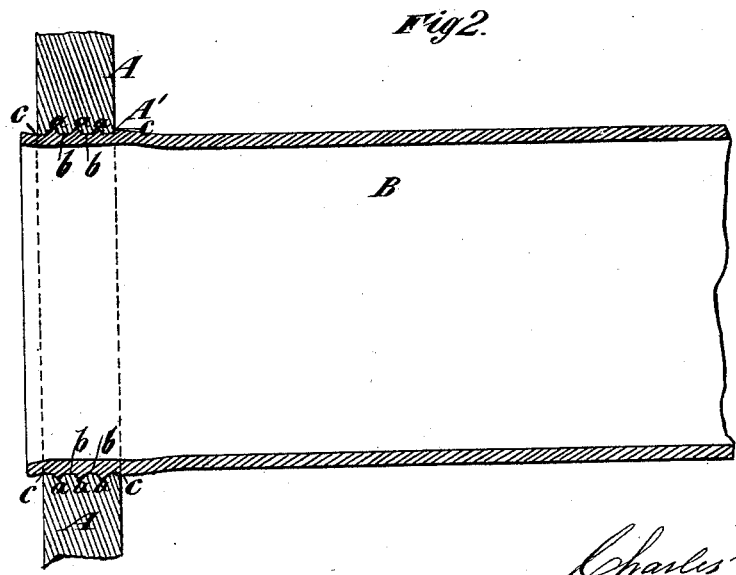

In the accompanying drawings, Figure 1 represents a section of a portion of a tube-sheet and a portion of a tube before its insertion into the tube-hole, and Fig. 2 represents a section through said tube-sheet and tube after the latter has been inserted and expanded to fasten it in place.

Similar letters of reference designate corresponding parts in both the figures.

A designates a portion of the tube-sheet of a boiler, and A' designates a tube-hole for the reception of a tube.

After being bored or cut of uniform diameter throughout, with straight sides, the tube-hole A' has cut in it a series of annular shallow grooves, *a a*, in planes at right angles to the length of the tubes, thus forming a series of straight annular cylindrical lands or portions, *b b*, interspersed between the grooves *a a*. These grooves may be of any form, but as here represented are shown as V-shaped, and when so formed the expanding of the tube is facilitated.

The grooves *a a* may be formed in any desirable manner—as, for instance, by means of expanding cutters in an ordinary drill-press.

After the tube-hole is thus prepared the tube B, having a smooth exterior of proper size to fit snugly in the lands *b b*, is inserted in the tube-hole and expanded by means of an ordinary roller-expander or other suitable means, until portions of the exterior of the tube are forced into the grooves *a a*, making a tight joint between the tube and the edges of each cylindrical land *b*. In order to make the joint still more secure the tube may be slightly expanded upon each side of the tube-sheet, as clearly shown at *c* in Fig. 2.

It will be observed that by the arrangement of grooves and interposed lands I provide for securing the tube without forcing out the inner surface of the tube to conform to the shape of the groove, as would be necessary were a single wide and deep groove made in the tube-sheet, and that therefore the fiber of the metal of the tube is not disturbed and the strength of the tube impaired.

What I claim as my invention, and desire to secure by Letters Patent, is—

1. The method of fastening tubes in tube-sheets, consisting in cutting in the tube-hole a series of independent and parallel annular grooves in planes at right angles to the length of the tube, forming a series of straight cylindrical lands or portions interspersed between the grooves, inserting the tube having a smooth exterior into the hole thus prepared, and expanding it therein to produce the entrance of portions of its exterior into said grooves, substantially as and for the purpose specified.

2. The combination, with a tube-sheet having a series of independent and parallel annular grooves formed in the wall of the tube-hole, with the lands *b* between said grooves, of the tube B, fitted into the tube-hole and expanded into the annular grooves so as to form a straight inner face, substantially as described.

CHAS. GRAHAM.

Witnesses:
M. B. FOWLER,
ED. C. GREENE.